United States Patent [19]
Lehrer

[11] Patent Number: 5,885,633
[45] Date of Patent: Mar. 23, 1999

[54] FLAVOR/SUPPLEMENT ENHANCING FILTER AND METHOD OF FORMING AND USING SAME

[76] Inventor: Robert Lehrer, 2 Pembrey Pl., Wilmington, Del. 19803

[21] Appl. No.: 911,597

[22] Filed: Aug. 14, 1997

[51] Int. Cl.[6] .............. B65B 29/02; C12C 3/08; A23L 3/08; A23P 1/00
[52] U.S. Cl. .............. 426/77; 426/88; 426/89; 426/84; 426/132; 426/422; 426/423; 426/495; 210/777
[58] Field of Search .............. 426/417, 487, 426/488, 506, 77, 78, 79, 82, 84, 32; 210/501, 502.1, 777, 422, 423, 495

[56] References Cited

U.S. PATENT DOCUMENTS

| | | | |
|---|---|---|---|
| 3,607,297 | 9/1971 | Fasano | 426/433 |
| 5,567,461 | 10/1996 | Lehrer | 426/417 |

*Primary Examiner*—Anthony J. Weier
*Attorney, Agent, or Firm*—Connolly & Hutz

[57] ABSTRACT

A filter is formed from a laminate of two sheets having a layer of adsorbent material and a layer of flavor enhancing material in the form of a flavor or supplement layer sandwiched between the sheets. Preferably, the adsorbent layer and the flavor or supplement layer are applied by a printing process.

7 Claims, 1 Drawing Sheet

FLAVOR/SUPPLEMENT ENHANCING FILTER AND METHOD OF FORMING AND USING SAME

BACKGROUND OF THE INVENTION

Filters are known for use with various fluids to remove impurities from the fluids. It is also known to enhance the flavor of fluids or to provide some addition to the fluid by passing the fluid through some flavor enhancing or supplemental material. It would be desirable if a combined structure could be provided which would both function as a filter to purify the fluid and also to enhance the flavor of or supplement the fluid. Such structure could be used for making coffee or tea or could be used with other types of fluids.

SUMMARY OF THE INVENTION

An object of this invention is to provide a flavor/supplement enhancing filter which utilizes a combined structure for filtering the fluids passing therethrough and for enhancing its flavor or supplementing the fluid.

A further object of this invention is to provide a method for making and using such a filter.

In accordance with one practice of this invention a pair of filter grade sheets is provided which permits fluid to pass therethrough. A layer of adsorbent material is formed between the sheets and particularly against the sheet which would function as the top most or applicating sheet while a layer of a functional material such as a flavor or supplement material is disposed between the adsorbent layer and the bottom most or discharge sheet.

In a preferred practice of the invention the layers are applied to the filter by controlled deposition such as printing techniques which permit an accurate registration of the layers in the filter.

In one embodiment of this invention a pattern of glue is applied to the applicating sheet so as to form spaced pockets in the areas free of the glue. The glue acts as a fluid impermeable barrier. An adsorbent material is then formed in the pocket by printing and a flavor or a desirable selected supplement material is printed either directly on top of the adsorbent layer or on the discharge sheet in a location for registration against the adsorbent layer when the two sheets are secured together. In this practice of the invention the glue functions to secure the sheets together.

In an alternative form of this invention the adsorbent layer is printed directly on the applicating sheet and a flavor or supplement layer is printed directly on the discharge sheet. The two sheets are then secured together in any suitable manner such as by crimping.

In a further practice of the invention multiple layers, including three or more layers, of functional materials (e.g. adsorbent, flavor, supplement) are applied by controlled deposition to form a multilayer structure between the applicating and discharge sheets.

THE DRAWINGS

DETAILED DESCRIPTION

The present invention relates to the controlled deposition of functional materials to filter sheets. Such functional materials may be adsorbents, flavor enhancing or supplement materials. A general practice of the invention results in combining filtering action and flavor enhancing or supplementing action in the same device so as to result in an enhancing filter which would be used with fluids wherein the fluid is first subjected to a filtering action by means of an adsorbent layer in the filter and then to a flavor enhancing or supplementing action by means of an encapsulated flavor or supplement material between the adsorbent layer and the discharge side or sheet of the filter. In one practice of the invention various pockets could be formed wherein the adsorbent material and flavor enhancing or supplementing material are located in the pockets. Reference is made, to my U.S. Pat. No. 5,304,305 and U.S. Pat. No. 5,567,461, all of the details of which are incorporated herein by reference thereto.

The various flavor or other enhancing materials and the fluids treated thereby could be of any suitable type. Reference is made to co-pending application Ser. No. 08/616,157, filed Mar. 14, 1996, all of the details of which are incorporated herein by reference thereto. That application discloses various types of fluids and flavor materials that could also be utilized with the present invention. As disclosed in that application, the material can be coffee grounds, tea, cocoa, baking mixes, cooking mixes, juices, flavors, milk, soup, dried powder infant formula, powdered creme and sugar. The invention may also be used wherein instead of enhancing the flavor of the fluid, some type of supplement could be added such as providing an anti-oxidant to cooking oil. Vitamins may also be used as supplement material. The invention may also be practiced in a broad manner wherein the only material added is a filtering material without adding any flavor enhancing or supplement material. In such case the filter could be used for collecting impurities for analysis purposes. Alternatively the adsorbent material could be omitted and the only material added is one or more flavor or supplement materials. Accordingly, the following description will be directed primarily to preferred practices of the invention, it being understood that the invention may be practiced in other manners consistent therewith.

Figure 1:
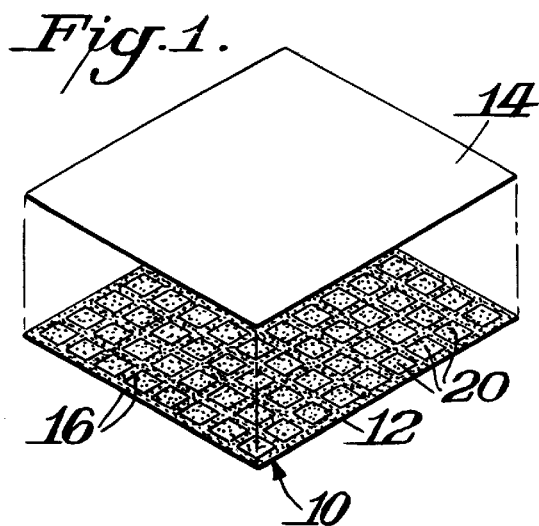
FIG. 1 is a perspective exploded view of a filter in accordance with one embodiment of this invention.
Figure 3:
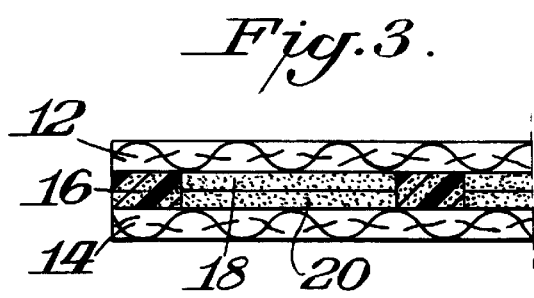
FIG. 3 is a cross-sectional view taken through FIG. 2 along the line 3—3.
Figure 2:
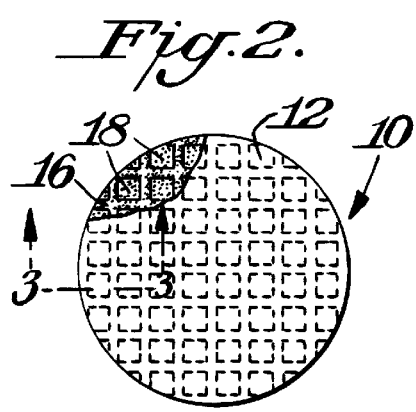
FIG. 2 is a top plan view partly broken away of a filter formed from the embodiment of FIG. 1.
Figure 4:
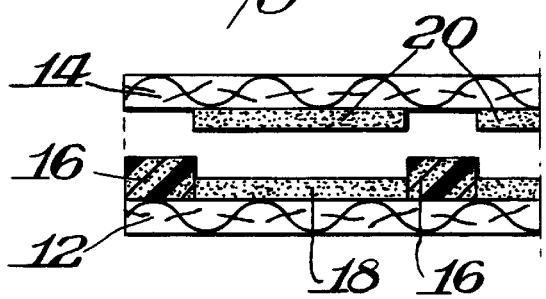
FIG. 4 is an exploded view of an alternative form of filter structured along the lines of the filter shown in FIGS. 1–3.

FIGS. 1–3 illustrate one embodiment of this invention wherein a filter 10 is provided having a pair of spaced sheets 12,14 made of filter grade paper. A pattern of glue 16 is applied to sheet 12 in any suitable manner. In the preferred practice of the invention the glue is applied by a controlled deposition such as electrostatic deposition or spraying with appropriate masking. The preferred deposition technique is a standard printing process, such as screen printing, gravure, lithography, flexography, or letterpress. A plurality of open spaces or pockets is formed between the lines of glue. After the glue 16 is dried a layer of adsorbent material 18 is applied in the pockets in any suitable manner and preferably by a printing process. The adsorbent material 18 is then permitted to dry. Next it is necessary to apply a flavor or supplement material in the pockets. This can be done either by directly applying the flavor or supplement material 20 on top of the adsorbent material 18 or, as shown in FIG. 4, the material 20 could be applied directly to the sheet 14.

Where the material 20 is volatile and/or to increase its shelf life, the material 20 could be encapsulated and then printed in encapsulated form.

After the material 20 has dried, the sheets 12 and 14 are brought toward each other to be secured together. In the embodiment of FIG. 1 where the material 20 has been applied directly against the adsorbent material 18 the sheet 14 and the sheet 12 carrying the various layers of glue 16, adsorbent 18 and material 20 are brought into contact with each other where the glue functions to secure the components together and form the finished filter product. In the embodiment of FIG. 4 the sheet 14 carrying the material 20 is moved relatively toward the sheet 12 carrying the glue 16 and adsorbent material 18 so that the material 20 then enters the pockets and is placed directly against the adsorbent material 18. By using a printing process it is possible to obtain an accurate registration of the material 20 into contact with the adsorbent material 18. The final filter may then be cut in any suitable shape such as the circular shape shown in FIG. 2. For use as a filter the laminate formed from the various components would be inverted 180° so that the sheet 12 is uppermost to act as an applicating sheet through which the fluid would first flow and the sheet 14 would be the lowermost sheet to be a discharge sheet from which the fluid would flow.

The glue 16 has the multiple functions of securing the sheets 12,14 together and of acting as a fluid impervious barrier to assure that the fluid flows through the materials 18,20 in the pockets.

Figure 5:
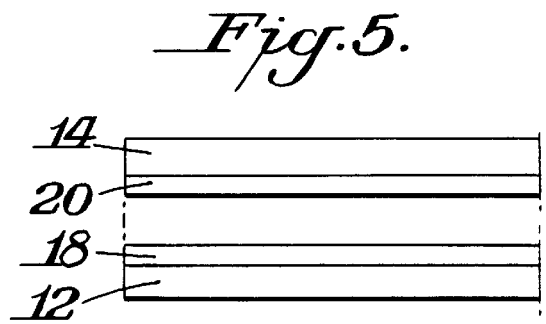
FIG. 5 is an exploded view of a further embodiment of this invention.
Figure 6:
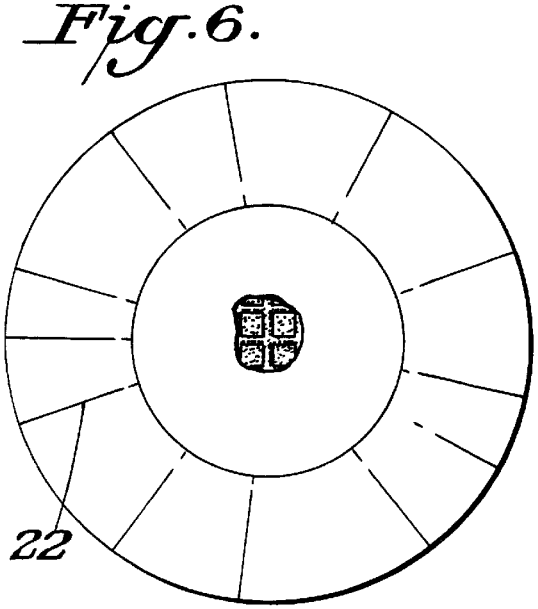
FIG. 6 is a top plan view of the filter shown in FIG. 5 in its assembled condition.

FIG. 5–6 illustrate a variation of the invention wherein the use of glue is omitted. As shown therein the sheet 12 would have a layer 18 of adsorbent material applied thereto in any suitable manner and preferably by printing and similarly the sheet 14 would have a layer of material 20 applied thereto in any suitable manner and preferably by printing. After the layers have dried, the sheets are brought into contact with each other to create a laminate consisting of the two sheets and the two layers sandwiched therebetween. The sheets are then secured together in any suitable manner, such as by crimping with the crimp lines 22 being illustrated in FIG. 6. The crimping could take place in a peripheral region of the sheets outwardly of the layers 18,20 or could take place where the layers 18,20 are also located.

The following is an example of a practice of the invention for enhancing the flavor of a fluid. An encapsulated flavor is dispersed in a suitable fluid-based binder to create an "ink" 20. The encapsulated flavor or ink 20 may be prepared by mixing water, glue and encapsulated flavor. The ink is then screen printed by a standard printing process, as noted above, on a suitable coffee filter paper or support sheet 12 which had previously been printed with an adsorbent or ink 18 composed of activated charcoal, an ion-exchange medium such as Bentonite, and glue. The resultant process yields a flavor coating of sufficient weight to flavor a pot of brewed coffee. A suitable paper cover sheet 14 is then laminated over the printed surface and the laminate is cut and shaped to fit a standard home-use coffee basket or a standard "cone" shape structure.

The filter 10 can then be placed in a compartment of a suitably designed manual, electric or other device in which water or, an alternative liquid (heated, cold or at ambient temperature) from a reservoir or from a container or directly from a water supply is made to flow through the filter and then to a collection vessel or vessels. In a specific example, the filter is placed in the basket of a commercially available coffee maker and 12 tablespoons of coffee are added to the filter. The water reservoir is filled with 12 cups of water and the standard brew cycle is initiated. The resultant flavored coffee can then be consumed directly in the usual manner.

The filter 10 thus functions so that the fluid initially flows through the pervious upstream applicating layer 12 and into contact with the adsorbent layer 16 which filters the fluid of impurities. The filtered fluid then flows into contact with the flavor material 20 which enhances the flavor of the fluid. The flavor enhanced filtered fluid is then discharged through discharge layer 14 where it is collected for later consumption.

As previously noted the invention may be practiced where the layer 20 contains some functional material for providing some treatment or alteration of the fluid. Such material may be generically considered as a functional material or supplement wherein the flavor is one specie and the adsorbent is another specie of the supplement or functional material. Another specie of the supplement or functional material would be providing a material to maintain concentration or prevent dilution of the original characteristics of the fluid. An example would be in connection with the treating of cooking oil, particularly in fast food restaurants where a practice is to reuse the oil a number of times. In such practice of the invention the layer of material 20 would replenish the quality or concentration of oil passing through the filter material. The layer 20 could be a supplement which includes an anti-oxidant that would be introduced into the fluid to replace spent anti-oxidant from the used oil.

The invention may also be practiced where only the adsorbent layer 18 is applied either with or without the glue pattern 16. In such practice of the invention the filter would be used to remove impurities from the fluid such as from contaminated water for analyzing the impurities in the fluid. In this practice of the invention the material in layer 18 might preferably be a silica type adsorbent such as bonded silica.

In the practice of the invention wherein a pattern of glue is provided to form spaced pockets which in turn are filled with one or more layers of material 18 and 20, it is preferred but not necessary to apply the various materials by a printing process. Other usable controlled deposition processes include electrostatic deposition and spraying with appropriate masking. The printing process, however, represents a distinct advantage of the invention in that it minimizes waste by avoiding applying excessive materials at portions of the paper which are ultimately not used in the filtering or enhancing/supplementing actions. Thus, for example, where the finished filter would have a circular shape such as shown in FIG. 2, by using a printing technique it is possible to apply a particular material in the circular shape which will later be cut from the papers at the proper location. Where multiple materials are used, the controlled deposition such as printing techniques permit the proper registration of the layers with respect to each other.

It is to be understood that the invention may be practiced with any number of layers between the applicating and discharge sheets. Thus, on the one hand a single layer 18 or 20 may be used. On the other hand multiple layers including three or more layers may be used. Where three or more layers are used one of the layers may be the adsorbent layer 18 with the remaining layers flavor and/or other supplement layers. Alternatively the adsorbent layer may be omitted and three or more flavor and/or other supplement layers may be used. Additionally, where multiple (two or more) layers are used, additional support sheets similar to sheets 12, 14 may be located between the layers. The sheets 12,14 may be made of paper or any other materials known for making filters which are pervious to the flow of fluid.

What is claimed is:

1. A filter for use with liquid comprising a support sheet made of a material which is inherently pervious to the flow of liquid, an intermediate layer formed from an ink containing water and flavor material and glue, said ink being applied to and bonded to said support sheet as a layer wherein said glue is liquid impervious and said water and flavor material are liquid pervious, a cover sheet secured to said intermediate layer remote from said support sheet, said cover sheet being made of a material which is inherently pervious to the flow of liquid, and a path of flow being formed for liquid flowing through said support sheet and said flavor material and said cover sheet whereby fluid may flow through said support and cover sheets and said flavor material to add flavor to liquid flowing through said filter.

2. The filter of claim 1 wherein said ink is a first ink and said intermediate layer is a first intermediate layer, a second ink applied as a second intermediate layer to said first intermediate layer, said second ink containing an activated charcoal and an ion-exchange medium and glue to comprise an adsorbent material.

3. The filter of claim 1 wherein said sheets are secured together mechanically.

4. A method of forming and using a filter comprising providing a support sheet made of a material which is inherently liquid pervious, providing an ink containing water and glue and flavor material, applying the ink to the support sheet as a layer, applying a cover sheet to the ink layer with the cover sheet made of a material which is inherently liquid pervious, flowing a liquid through the support sheet and through the ink layer and through the cover sheet, and contacting the liquid with the flavor material as the liquid flows through the ink layer.

5. The method of claim 4 wherein the ink is a first ink and the layer is a first layer, applying a second ink in a second layer against the first layer wherein the second ink contains an activated charcoal and an ion-exchange medium and glue, and additionally flowing the liquid through the second layer.

6. The method of claim 4 including applying the second ink after the first ink has dried.

7. The method of claim 4 wherein the ink is applied by a printing technique.

* * * * *